(12) United States Patent
Kim et al.

(10) Patent No.: US 9,501,699 B2
(45) Date of Patent: Nov. 22, 2016

(54) SYSTEMS AND METHODS FOR ESTIMATING THE GEOGRAPHIC LOCATION AT WHICH IMAGE DATA WAS CAPTURED

(75) Inventors: Hakjae Kim, Lorton, VA (US); Warren Dixon, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 142 days.

(21) Appl. No.: 14/004,972

(22) PCT Filed: May 12, 2012

(86) PCT No.: PCT/US2012/037673
§ 371 (c)(1),
(2), (4) Date: Sep. 13, 2013

(87) PCT Pub. No.: WO2012/177336
PCT Pub. Date: Dec. 27, 2012

(65) Prior Publication Data
US 2014/0064624 A1 Mar. 6, 2014

Related U.S. Application Data (60) Provisional application No. 61/484,904, filed on May 11, 2011.

(51) Int. Cl.
| | | |
|---|---|---|
| *G06T 7/00* | (2006.01) | |
| *G06K 9/00* | (2006.01) | |
| *G06K 9/62* | (2006.01) | |

(52) U.S. Cl.
CPC .......... *G06K 9/0063* (2013.01); *G06K 9/6211* (2013.01); *G06T 7/0018* (2013.01)

(58) Field of Classification Search
CPC .............. G06T 17/05; G06T 3/04038; G06T 2207/10032; G06T 2207/30184; G06T 2207/30244; G06T 3/0031; G01C 11/06; H04N 5/23238; G06K 9/00704
See application file for complete search history.

(56) References Cited

U.S. PATENT DOCUMENTS

| | | | |
|---|---|---|---|
| 6,011,199 A | 1/2000 | Speirs et al. | |
| 7,764,838 B2 | 7/2010 | Jolly et al. | |

(Continued)

FOREIGN PATENT DOCUMENTS

| | | |
|---|---|---|
| WO | 9422289 A1 | 10/1994 |
| WO | 2011023416 A2 | 3/2011 |

OTHER PUBLICATIONS

Gridding-based three-dimensional image reconstruction from projections with arbitrary directions Penczek, P.A.; Renka, R.; Schomberg, H. Biomedical Imaging: Nano to Macro, 2004. IEEE International Symposium on Year: 2004 pp. 936-939 vol. 1, DOI: 10.1109/ISBI.2004.1398693.*

(Continued)

*Primary Examiner* — Kim Vu
*Assistant Examiner* — Michael Vanchy, Jr.
(74) *Attorney, Agent, or Firm* — Thomas | Horstmeyer, LLP; Christopher B. Linder; Randy R. Schoen (57) ABSTRACT

In some embodiments, a system and method for estimating the geographical location at which image data was captured with a camera identifies matching feature points between the captured images, estimates a pose of the camera during the image capture from the feature points, performs geometric reconstruction of a scene in the images using the estimated pose of the camera to obtain a reconstructed scene, and compares the reconstructed scene to overhead images of known geographical origin to identify potential matches.

25 Claims, 7 Drawing Sheets

(56) References Cited

U.S. PATENT DOCUMENTS

| | | | |
|---|---|---|---|
| 7,872,669 B2 | 1/2011 | Darrell et al. | |
| 8,174,568 B2* | 5/2012 | Samarasekera et al. | 348/113 |
| 2003/0095711 A1* | 5/2003 | McGuinness et al. | 382/209 |
| 2006/0075442 A1 | 4/2006 | Meadow | |
| 2008/0249702 A1 | 10/2008 | Ofek et al. | |
| 2008/0310757 A1* | 12/2008 | Wolberg et al. | 382/285 |
| 2010/0328462 A1 | 12/2010 | Chen | |
| 2011/0029226 A1 | 2/2011 | Deluca et al. | |
| 2011/0064312 A1* | 3/2011 | Janky et al. | 382/195 |
| 2011/0090337 A1* | 4/2011 | Klomp | G01C 11/025 348/144 |

OTHER PUBLICATIONS

Localization and Control of an Aerial Vehicle through Chained, Vision-Based Pose Reconstruction K. Kaiser; N. Gans; W. Dixon 2007 American Control Conference Year: 2007 pp. 5934-5939, DOI: 10.1109/ACC.2007.4282896.*

International Preliminary Report on Patentability dated Nov. 21, 2013.

International Search Report and Written Opinion dated Jan. 2, 2013.

International Search Report and Written Opinion dated Dec. 28, 2012.

* cited by examiner

Highest probability match

SYSTEMS AND METHODS FOR ESTIMATING THE GEOGRAPHIC LOCATION AT WHICH IMAGE DATA WAS CAPTURED

CROSS-REFERENCE TO RELATED APPLICATION(S)

This application is the 35 U.S.C. §371 national stage of PCT application PCT/US2012/037673 filed May 12, 2011 which claims priority to and the benefit of U.S. Provisional Application Ser. No. 61/484,904, filed May 11, 2011, both of which are hereby incorporated by reference herein in their entirety.

NOTICE OF GOVERNMENT-SPONSORED RESEARCH

This invention was made with Government support under contract number 00078739, awarded by the U.S. Department of Defense. The Government has rights in the claimed inventions.

BACKGROUND

In certain situations, it is desirable to be able to determine the geographic location at which arbitrary image data, such as still images or video, was captured. That location can in some cases be determined from a description that is presented along with the image data or from metadata that is embedded in the image data. When such information is not provided, image matching algorithms can sometimes be used to determine the location at which the image data was captured. Specifically, the scenes within the image data can be compared to scenes within images of one or more databases. If the scene or a part of the scene in the image data matches a scene or part of a scene of an image of known origin stored within the database, it can be assumed that the image data was captured at the same location as was the database image. Unfortunately, the effectiveness of a technique is limited by the content of the database. Although it may be relatively easy to identify a location when it is a location that is frequently photographed, such as tourist destinations, it may be more difficult to find matches for image data that was captured at other locations.

From the above discussion, it can be appreciated that it would be desirable to be able to estimate the geographic location at which image data was captured without having to rely on conventional image matching.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to be able to estimate the geographic location at which image data, such as a still image or a video clip, was captured without relying on conventional image matching. Described herein are systems and methods with which the location at which "ground-level" image data (e.g., video) of a scene was captured can be estimated by determining the geometry of the scene and comparing it with overhead images of known geographical origin. With such a process, the ground-level viewpoint of the location can be correlated with an overhead viewpoint of the location. In some embodiments, feature points are matched between captured images (frames), the rotation and translation of the camera are estimated, and Euclidean reconstruction of the scene is performed to obtain a reconstructed scene process. The geometry within the reconstructed scene can then be compared with overhead images, such as satellite images, to find a possible match. In further embodiments, "white spaces" that exist between objects in the scene and the camera are also used in the matching process.

In the following disclosure, multiple embodiments are described. It is noted that those embodiments are merely example implementations of the disclosed inventions and that other embodiments are possible. All such embodiments are intended to fall within the scope of this disclosure.

Described herein are systems and methods for determining the geographical location at which image data, such as arbitrary hand-held video captured by a user on the ground, was captured by transforming the image data into a reconstructed scene and comparing reconstructed scene with an overhead image of the area. The systems and methods overcome major difficulties of other geolocation approaches, such as the limitations of image databases and computational expense.

Because the ground-level perspective is substantially orthogonal to the overhead perspective, images taken from the two perspectives do not share much information. This, of course, makes comparison of ground-level images and overhead images difficult. This difficulty can be overcome, however, by conducting viewpoint transformation using the Euclidian geometry reconstruction of the captured scene and using spatial information of the reconstructed scene to localize the scene within the overhead image. Such reconstruction can be performed by first matching feature points across the images (frames) and estimating the pose of the camera that captured the images. These steps are described below.

Feature Detection and Matching

Figure 1A:
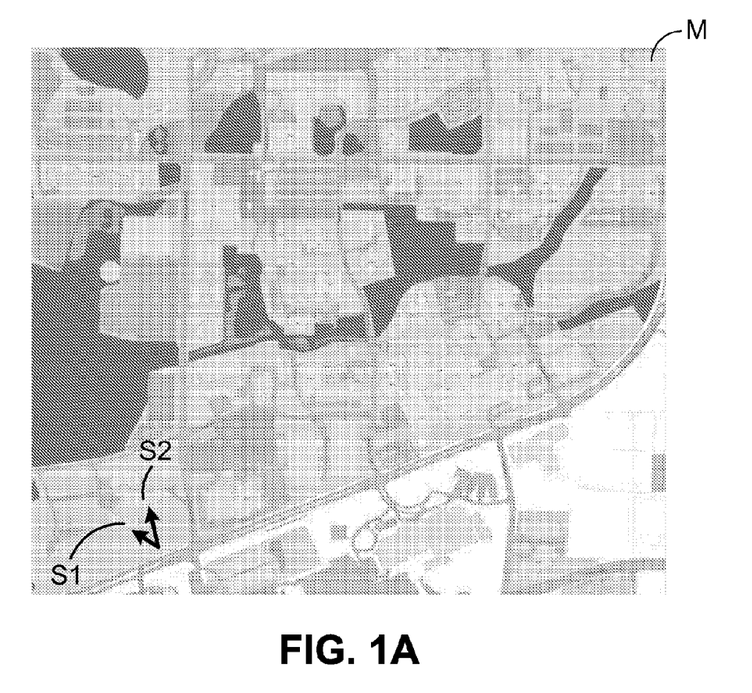
FIG. 1A is an overhead map of an example geographical area of interest.
Figure 1B:
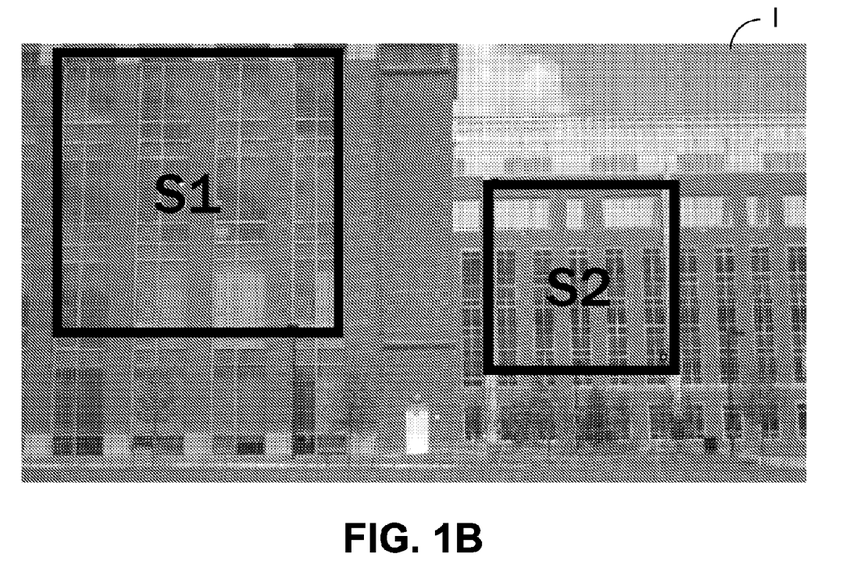
FIG. 1B is a ground-level image captured a particular location identified on the map of FIG. 1A FIGS. 2A and 2B are close-ups of portions of the image shown in FIG. 1B and identify feature points on first and second buildings captured in the image.

FIG. 1B shows an example ground-level image I that can, for example, comprise one or many frames of a video sequence that was captured with a camera. The image was captured at a particular location identified in an overhead map M of a geographical area of interest (the campus of the University of Florida in this example), which is shown in FIG. 1A. The scene captured in the image of FIG. 1B includes two buildings: building S1 on the left and building S2 on the right. The locations of those buildings are identified in the map of FIG. 1A, as is the perspective from which the image was captured (see the diverging arrows in FIG. 1A).

Figure 2A:
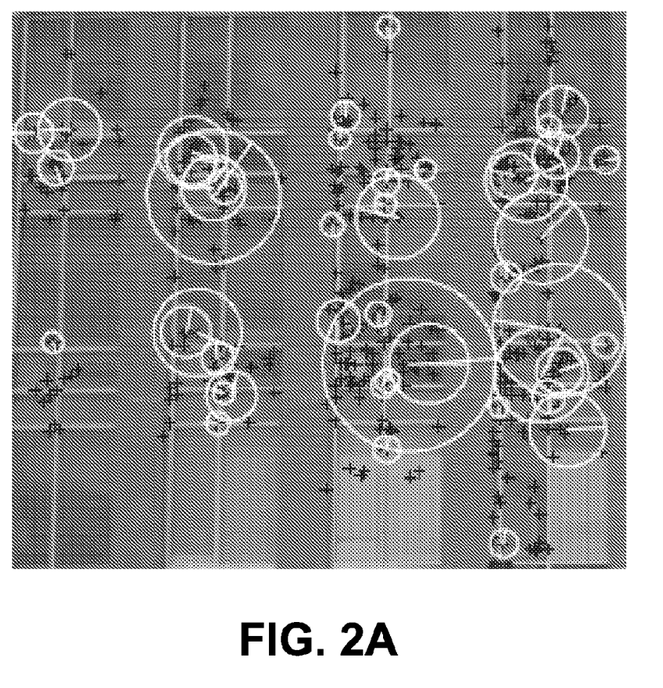
Figure 2B:
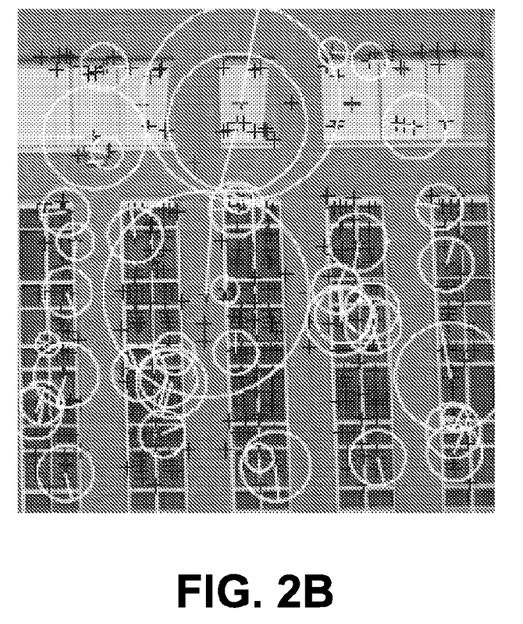

As noted above, one step in the reconstruction process identifying matching feature points in the images. FIGS. 2A and 2B are portions of the image shown in FIG. 1B (portions identified in FIG. 1B with rectangles labeled S1 and S2) and illustrate example feature points associated with buildings S1 and S2, respectively. Feature point matching is performed to see how the feature points in the scene "move" from image to image (frame to frame) and therefore provides an indication of the relative movement between the scene and the camera. Assuming that the scene is stationary, the relative movement arises from movement of the camera in terms of rotation and translation. In some cases, this movement can be the result of panning of the camera during image capture. In other cases, the movement can be the result of movement of an object, such as an unmanned autonomous vehicle (UAV), to which the camera is mounted. Regardless, understanding how the camera is moving relative to the scene enables determination of the geometry and position of objects (and voids) within the scene. The determination of such that geometry and position is a structure-from-motion problem. In other words, the geometry of the scene can be reconstructed from an estimated motion of the camera.

A number of different techniques can be used to match local image features. One such method is scale invariant feature transformation (SIFT). The SIFT process has many properties that are important in matching different images of an object or scene. Specifically, the process invariant to image scaling and rotation and is partially invariant to change in illumination and three-dimensional camera viewpoint. In SIFT, potential key points are selected by scanning over entire scales and image locations. This can be efficiently implemented by constructing a Gaussian pyramid and searching for the local maxima in a collection of different Gaussian images.

Next, candidate key-points are localized to sub-pixel accuracy and are selected based upon their stability. The dominant orientations for each key point are identified based on their local image patch. Assigned orientation, scale, and location for each key point are used as bases to transform all image data, which provides invariance to similarity transforms. The last stage of SIFT involves building a local image descriptor that is compact, distinctive, and robust to illumination and camera viewpoint. The key points from the images are extracted and saved from each image, and then the descriptors are compared to compute corresponding feature matches between images.

Significantly, feature point matching can be performed using other than SIFT methods. For example, feature point matching can be achieved using one or more of Harris points, mutual information points, or Kanade-Lucas-Tomasi points. Regardless of how the feature point matching is performed, the result is point correspondence between the images and a set of feature points is obtained, the set comprising a plurality of feature point pairs, each pair comprising a first point within a first image associated with a given feature in the scene and a second point within a second image also associated with the given feature.

Camera Pose Estimation

The feature points obtained from the feature point matching described above can be used to estimate the pose (i.e., rotation and translation) of the camera as the images were captured. As was previously noted, the pose of the camera may change because of panning of the camera because of movement of an object to which the camera is mounted. Regardless, the movement of the camera facilitates determination of the geometry of objects in the captured scene.

An important aspect of effective pose estimation is rejecting outliers prior to estimation because point correspondences returned by the feature tracker often contain gross mismatches or large errors in feature point locations. A number of algorithms exist to solve this problem. Example solutions include random sample consensus (RANSAC), RANSAC+Least Squares, and nonlinear mean shift, which are hypothesize-and-test methods. Another solution is a new pose estimation algorithm developed by the inventors called pose estimation by gridding of unit spheres (PEGUS), which has been shown to have superior performance as compared to that of RANSAC+Least Squares and the nonlinear mean shift.

PEGUS involves three major stages. The first stage is the hypothesis generation stage, which is used to reduce the number of feature points that will be used to estimate the camera pose. In this stage, a sampling-with-replacement strategy is used to generate n number of hypotheses that have small "correlation." The total number of pose hypotheses, $N_{max}=(M/P)$, is typically an extremely large number, where M is the number of corresponding points and P is minimum number required for pose estimation. Because it is computationally expensive to consider all of the pose hypotheses, only a relatively small number of sample hypotheses, n, is used. In some embodiments, n=4 or 8.

The second stage of the PEGUS process is rotation estimation. The first step in this stage is estimating the mode of the rotation hypotheses. Each rotation hypotheses matrix is transformed into unit-quaternions, q. Each unit-quaternion $q_i$ is plotted onto the surface of 3-sphere $\mathbb{S}3$ and the surface of sphere is divided into a number of regions of equal area. The probability mask function (PMF) of the random variable q can be estimated by counting the number of rotation hypotheses that lie within each region. Once the region with the greatest number of unit-quaternions is identified, the mode of the PMF, $q^*$, can be estimated by finding the point that occurs most frequently in the region. The next step involves is extracting low-noise measurements. The rotation hypotheses that is within the distance of $\epsilon q$ form the mode $q^*$ is selected such that following equation is satisfied $$d_q(q^*,q_i)<\epsilon_p \quad \text{[Equation 1]}$$

where the distance function $d_p(\cdot,\cdot)$ is the Riemannian distance. The final step in the rotation estimation is averaging low-noise data. In a Euclidian sense, the optimal average, $\hat{R}$, of the rotation matrices can be computed by $$\hat{R} = \operatorname*{argmin}_{R \in SO(3)} \sum_{i=1}^{N_I} \|R_i - R\|^2 \quad \text{[Equation 2]}$$

where $N_1$ is the number of elements in the low noise rotation hypotheses and $R_i$ denotes the rotation matrix corresponding to $q_i$. The optimal average $\hat{R}$ can be computed by performing an orthogonal projection of the arithmetic average on to the special orthogonal group SO(3).

Figure 3:
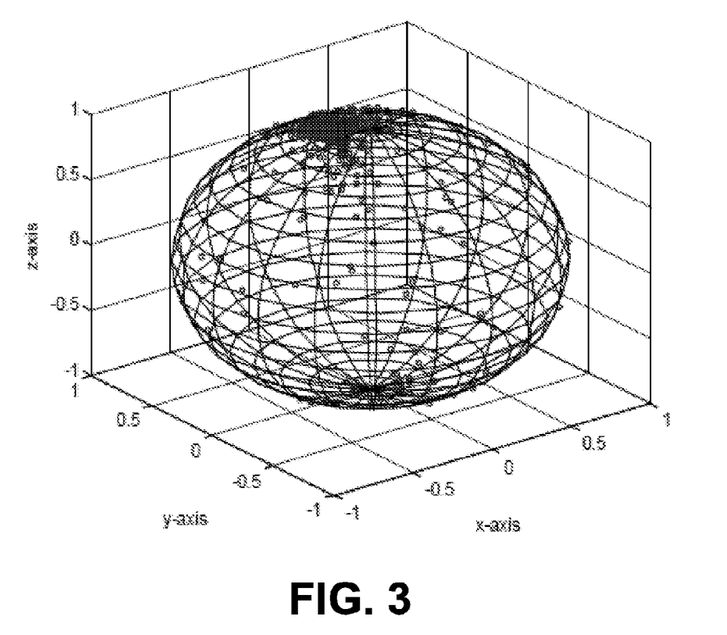
FIG. 3 is a projection of translation to a unit sphere that is performed during pose estimation by gridding of unit spheres (PEGUS).

The third stage of the PEGUS process is translation estimation. Unit translation estimation, which provides the direction of the camera, is very similar to that rotation estimation. A mode of translation hypotheses is first identified. Each translation hypothesis is plotted onto the surface of 2-sphere $\mathbb{S}^2$, and the surface of sphere is divided into number of regions of equal area as shown in FIG. 3. The PMF of the random variable t can be estimated by counting the number of rotation hypotheses that lie within each region. Once the region with greatest number of unit-quaternions has been identified, the mode of the PMF, t*, is estimated by finding the point that occurs most frequently in the region. Next, low-noise measurements are extracted. A low-noise set of translation hypotheses is then selected by taking pre-defined small positive number $\epsilon_t$, and collecting the points around the mode t* that satisfies $$d_t(t^*, t_i) < \epsilon_t \qquad \text{[Equation 3]}$$

where $d_t(t^*, t_i)$ is the geodesic distance between the unit translation vectors t*, and $t_i$. Because the hypotheses of a unit translation are elements of $\mathbb{S}^2$, the optimal average is achieved by taking the normalized arithmetic mean of the low-noise set, which is given by $$t = \frac{\sum_{i=1}^{N_2} \frac{t_i}{N_2}}{\left\| \sum_{i=1}^{N_2} \frac{t_i}{N_2} \right\|} \qquad \text{[Equation 4]}$$

where $N_2$ is the number of elements in the low-noise data set of unit translation. When PEGUS is used with a homography matrix that includes scaled depth information, the translation between the two views are elements of $\mathbb{R}^3$, not $\mathbb{S}^2$. In this case, histogram construction, mode estimation, and hypotheses extraction are performed by dividing a particular volume of $\mathbb{R}^3$ into $K_t$ bins of equal volume, where each bin is a cube with equal sides. The volume to grid is chosen to include all the hypotheses. The remainder of the process is substantially the same as the unit translation case. In some embodiments, the rotation and translation hypotheses can be coupled together to represent complete pose of the camera between two images.

Further details regarding PEGUS are provided in PCT/US06/004469, which is hereby incorporated by reference into the present disclosure. Although PEGUS has been explicitly identified as a suitable method for determining camera pose, it is noted that other pose estimation techniques, such as one or more of those identified above, can be used.

Euclidian Reconstruction with a Single Known Length

The structure-from-motion problem can be solved to attach reference frames to piecewise planar objects in a scene using the methods described above. Geometric reconstruction can then be performed using the Euclidian homography relationship. Although the reconstructed scene could be iteratively rescaled and compared to overhead images, the matching process can be conducted far more quickly when a length of an object in the scene is known. In some embodiments, a reference length can be manually input by a user. For example, if the scene includes an object that has a typical length, such as a door, the user can communicate to the program performing the location estimation that the door in the scene is of a particular length (e.g., approximately 7 feet). Alternatively, one or more image analysis algorithms can be used to automatically determine the reference length. For example, an image analysis algorithm can identify an object in the scene having a typical length and provide that length to the location estimation program. In other embodiments, the known velocity of the camera can be used in lieu of a known length.

The case considered here is one in which a large number of feature points P are grouped into k sets of coplanar points $P_h \subset P, \forall h \in \{1 \ldots k\}$, where all points in $P_h$ lie in a plane $\pi_h$. The coordinate of the $j^{th}$ point in $P_h$ is given as $$\overline{m}^*_{hj} = [x^*_{hj}, y^*_{hj}, z^*_{hj}]^T,$$

$$\overline{m}_{hj}(t) = [x_{hj}, y_{hj}, z_{hj}]^T,$$

$$\forall j \in \{1 \ldots N_h\}, \forall h \in \{1 \ldots k\} \qquad \text{[Equation 5]}$$

in the frames $F^*_c$ and $F_c(t)$, respectively. The normalized coordinates of $\overline{m}^*_{hj}$ and $\overline{m}_{hj}(t)$ projected onto the image plane $\pi_i$ are given as $$m^*_{hj} = \left[ \frac{x^*_{hj}}{z^*_{hj}}, \frac{y^*_{hj}}{z^*_{hj}}, 1 \right]^T, \qquad \text{[Equation 6]}$$

$$\forall j \in \{1 \ldots k\}$$

$$m_{hj}(t) = \left[ \frac{x_{hj}(t)}{z_{hj}(t)}, \frac{y_{hj}(t)}{z_{hj}(t)}, 1 \right]^T,$$

$$\forall j \in \{1 \ldots k\}$$

For each set of points, there exists a homography $H_h(t) \in \mathbb{R}^{3 \times 3}$ such that relationship between $\overline{m}^*_{hj}$ and $\overline{m}_{hj}(t)$ is given by $$m_{hj} = \alpha H_h m^*_{hj} \qquad \text{[Equation 7]}$$

$$= \alpha \left( R(t) + \frac{x(t)}{d^*_h} n^{*T}_h \right) m^*_{hj} \qquad \text{[Equation 8]}$$

where $$\alpha = \frac{z^*_{hj}}{z_{hj}}$$

is a scalar depth ratio, R(t) is rotation matrix, x(t) is true translation vector, $d^*_h$ is depth, $n^*_h$ is normal to the plane $\pi_h$. R(t) and x(t) are the same for all point sets because all coordinate changes are due to the motion of the camera. However, each $P_h$ has a different $d^*_h$ and $n^*_h$. Therefore, $H_h(t)$ is also distinct. Each $H_h(t)$ is decomposed into $$R(t),$$

$$\frac{x(t)}{d^*_h}$$

and $n^*_h$. Note that translation is only recovered up to a scaled factor $$x_h(t) = \frac{x(t)}{d^*_h}$$

and the depth $d^*_h$ is generally unknown.

Based on the assumption that the constant, scalar length $$\bar{s}_{h1} = \|\overline{m}^*_{h1} - \overline{m}^*_{h2}\| \qquad \text{[Equation 9]}$$

is known, $d^*_h$ can be recovered. Without loss of generality, the length is assumed to be known in set $P_1$. The translation $x(t)$ is then recovered from $d^*_1$ as $$x(t) = d^*_1 x_1(t) \qquad \text{[Equation 10]}$$

Given $x(t)$, each $d^*_h$ can be recovered by $$d^*_h = \frac{x_h^T x(t)}{x_h^T x_h} \qquad \text{[Equation 11]}$$

At this point, all of the information that is needed to compute Euclidian coordinates of all points P visible in the image are possessed. Euclidian coordinates of the $j^{th}$ point in plane $P_h$ is given by $$\overline{m}^*_{hj} = \frac{d^*_h m_{hj}}{n^*_h m_{hj}}, \qquad \text{[Equation 12]}$$

$$\forall j \in \{1 \ldots N\}$$

Geographic Location Estimation

The three-dimensional scene reconstructed from the sequence of captured images will comprise the information about the geometry of various objects in the scene as well as the "white spaces" in the scene, which can be defined as the areas between the objects and the camera that are substantially devoid of vertically-oriented objects. Examples of white space can include "voids" such as lawns or fields, forests, bodies of water, parking lots, etc. The object geometries and the white spaces can be compared with the overhead images in an effort to find a match. Because the geometry and the white spaces extracted from the reconstructed scene cannot be compared directly with a raw satellite image, the satellite images are first processed such that both the reconstructed scene and satellite image contain similar information that can be easily compared. One way of achieving this is to generate an occupancy-grid map (OGM) representation in which each pixel represents actual scaled physical space in real world.

The OGM comprises a two-dimensional array of cells corresponding to a horizontal grid imposed on the area to be mapped. The grid has n×m cells, and each cell has size of s×s. Occupancy status with an associated certainty factor are assigned to every cell in the OGM using "0" for empty and "1" for occupied. Probabilistic representation can alternatively be used in which case the probability of a cell being occupied is represented with values between "0" to "1". The OGM representation is simple to construct, even in large-scale environments. Because the intrinsic geometry of a grid corresponds directly to the geometry of the environment, the location estimation of the reconstructed scene can be determined by its pose (position and orientation) in real world. In some embodiments, the environment is represented with two OGMs. The first OGM is a local model of the environment, which represents three-dimensional virtual space reconstructed from the image data, and the second OGM is a global model of the environment, which represents virtual space of a satellite image that is segmented into different layers, such as the contours of objects (e.g., buildings) and different types of white spaces.

Figure 4:
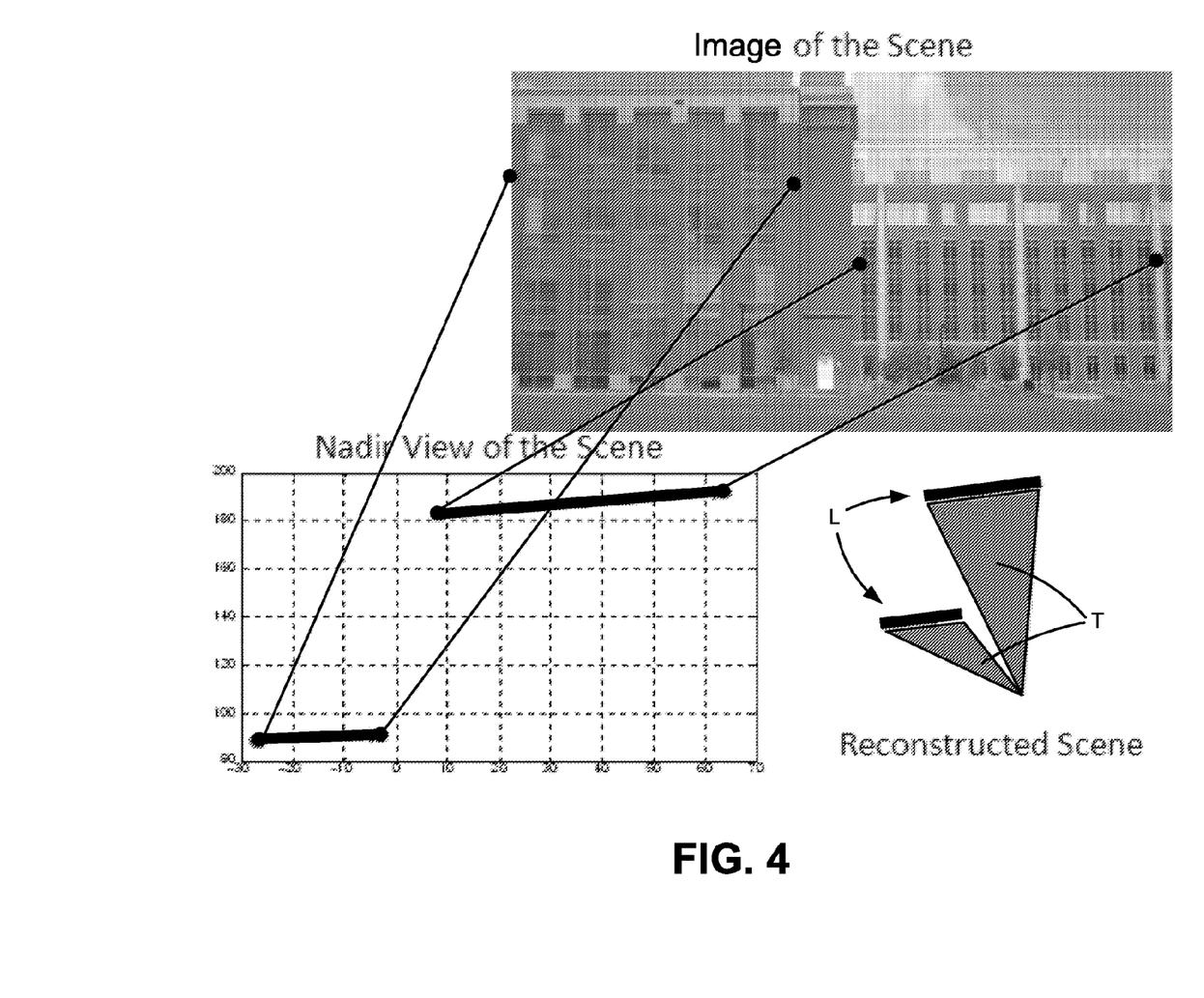
FIG. 4 comprises an uncropped version of the image shown in FIG. 1B and illustrates a reconstructed scene that has been generated from the image using geometric reconstruction.
Figure 5:
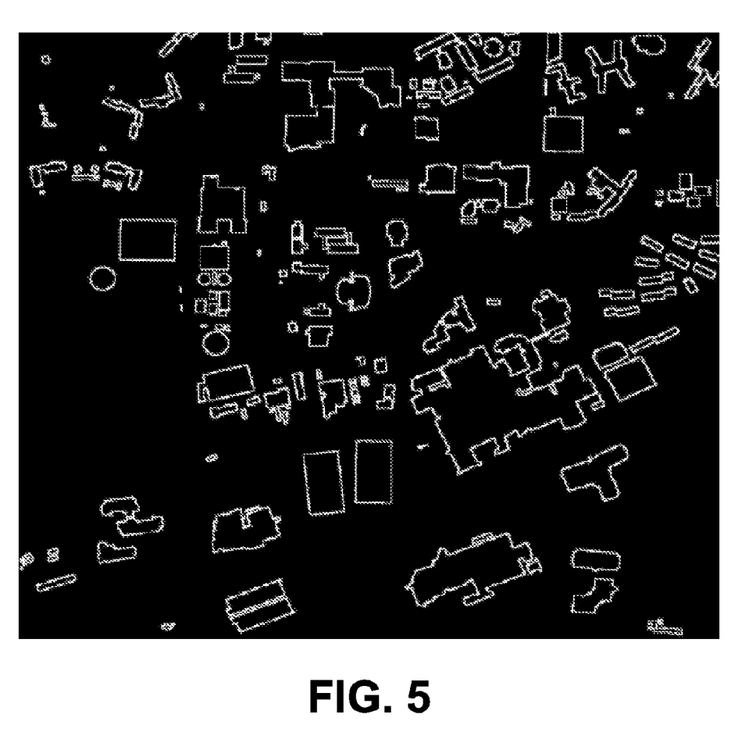
FIG. 5 is an occupancy grid map generated from a satellite image of the geographical area of interest shown in FIG. 1A.
Figure 6A:
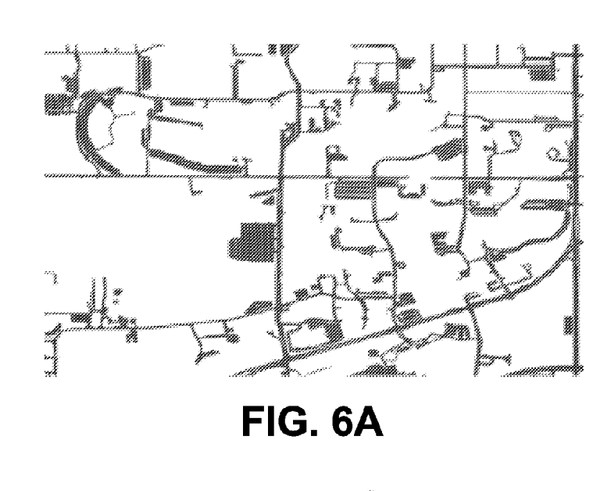
FIGS. 6A-6D are example segmented maps that show only particular types of white spaces contained within a satellite image.
Figure 6B:
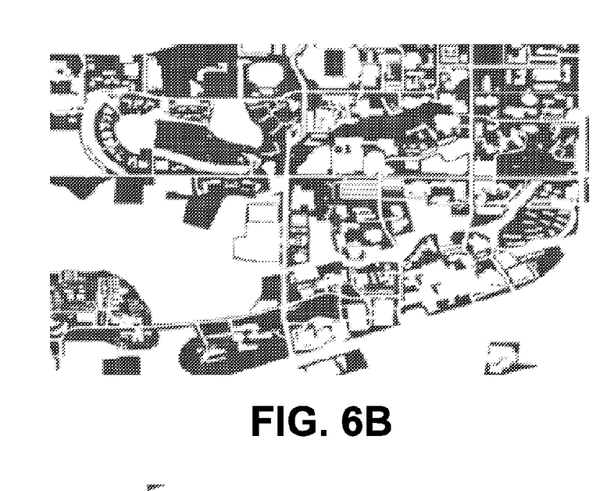
Figure 6C:
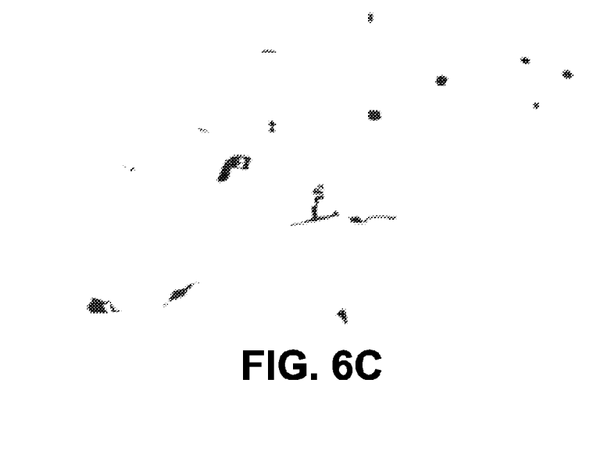
Figure 6D:
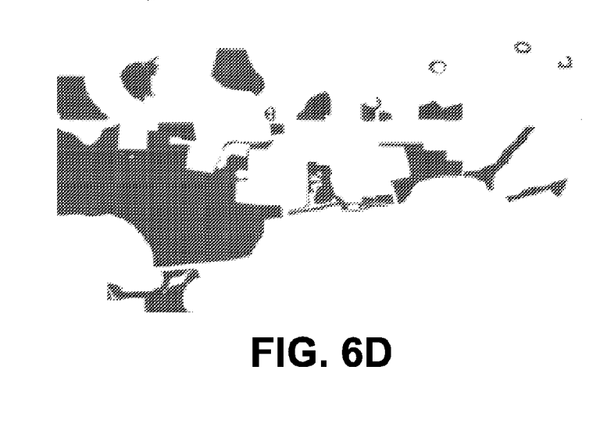

FIG. 4 illustrates an example of a reconstructed scene (lower right) associated with an image (upper right), which is an uncropped version of the image I shown in FIG. 1B. The parallel lines L in the reconstructed scene represent the faces of the buildings S1 and S2 in the scene (see FIG. 1B), and the triangles T represent the white spaces between camera and the building faces. A satellite image can be segmented in a similar manner and the outlines of objects (e.g., buildings) and white spaces can be represented in an OGM. FIG. 5 shows an example OGM that was created from a satellite image of the geographical area represented by the map of FIG. 1A. As can be appreciated from FIG. 5 when compared to FIG. 1A, the OGM identifies the boundaries of the buildings in the geographical area that is the subject of the map.

Standard and hierarchical brute-force searching can be used to search the OGM for the best match. A sufficient number of points is sampled from the outlines of the objects and white spaces in the OGM to represent a probabilistic space of the reconstructed scene. For a hierarchical search, a minimum number of sample points from the white space is used to search along the matching white spaces to ensure time is not wasted searching through an unwanted area. Conditional probability of a match X given an ith orientation local OGM is calculated by counting the number of matching points then using mismatched points to penalize the function.

In some embodiments, the probability calculation is performed as follows:

% Define variables and sample from work space
So=sampled points from contour of objects
Sw=sampled points from whitespace
[$xo_{id}$,$yo_{id}$]=find index of So
[$xw_{id}$,$yw_{id}$]=find the index of Sw
$N_{index}$=size of ($xo_{id}$)
$C_v$=cells in local OGM representing reconstructed video
$C_s$=cells in global OGM representing satellite map
$m_i$=$i^{th}$ orientation of local OGM
% Calculate probability of match X $$Pr(X \mid m_i) = \frac{(C_v(xo_{id}, yo_{id})C_s(xo_{id}, yo_{id})^T)}{N_{index}} - \lambda(C_v(xw_{id}, yw_{id})C_s(xw_{id}, yw_{id})^T)$$

The calculated probability is stored and the process is repeated until the entire search space is covered for all $m_i$ for i=(1, 2, . . . , n).

In some embodiments, the white spaces within the satellite image can be identified and categorized using an appropriate image analysis algorithm to distinguish between multiple different types of white spaces. FIGS. 6A-6D illustrate pavement, flat vegetation, water, and dense vegetation white spaces, respectively, that were obtained from an example satellite image (not shown). When similar categorization of the white spaces of the reconstructed scene is performed (e.g., again using an appropriate image analysis algorithm), such categorization can be used to eliminate possible match candidates, and therefore can increase speed of the matching process. For example, if the white space within the captured scene is determined to comprise water and a satellite image is determined to contain no water, the satellite image and its OGM can be eliminated as a potential match for the reconstructed scene.

Experimental Results

Experiments were conducted to evaluate the performance of the above-described geolocation method. Test videos were taken across the University of Florida campus and reconstructed scenes were compared with an OGM of a satellite map of the campus. The range finder of the camera was used to measure distances between the camera and each object in the capture scene, and the measured distances were used as ground truth for scene reconstruction. Both standard search and hierarchical search results were determined and compared in terms of search duration for a single orientation. For each experiment, a probabilistic measure of match between a reconstructed scene and satellite map was calculated for an entire space of interest and then the best possible candidates (within 5% from the highest probability) were chosen based on their probability score. The location with highest probability was identified in the OGM with red star and other possible locations were marked with green circles for each case.

Both the standard and hierarchical search schemes were found to be effective at identifying the location at which the video was captured. The standard search was also found to generate more false positives than the hierarchical search and suffered from longer computation times. A search duration time comparison showed that the hierarchical search improves the speed of search by an average of 76%.

Example Systems and Methods

Figure 7:
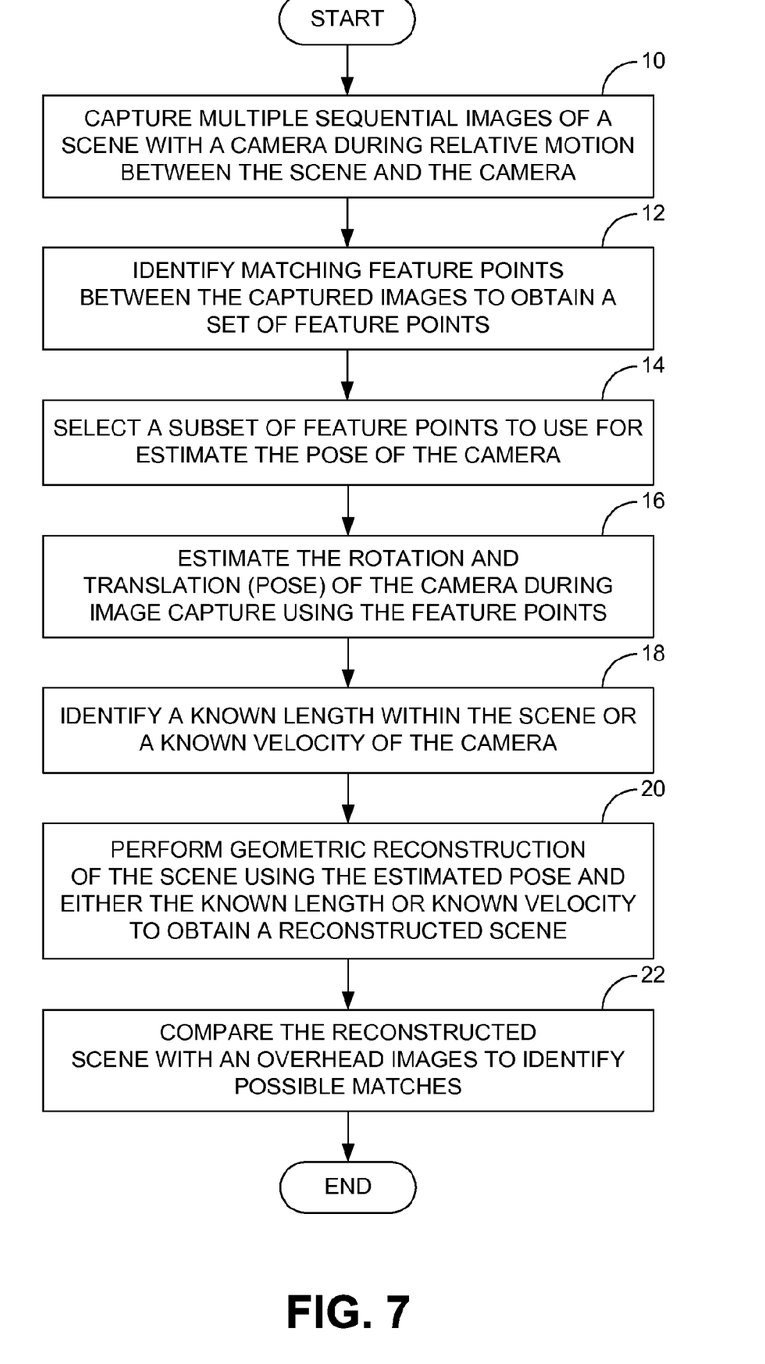
FIG. 7 is a flow diagram that describes of an embodiment of a method for estimating the geographic location at which image data was captured.

FIG. 7 is a flow diagram of an example method for estimating geographic location that is consistent with the above discussion. Beginning with block 10, multiple sequential images of a scene are captured with a camera. In some embodiments, the images can be individual images that are captured with a still camera. In other embodiments, the images are video frames that are captured with the camera. Regardless, there is relative motion between the camera and the scene as the images are captured. As was noted above, the relative motion can be the result of, for instance, panning of the camera or movement of an object to which the camera is mounted. The number of frames that are required for acceptable results may depend upon several factors, including the quality of video data. Generally speaking, however, the greater the number of frames that are selected, the better the estimate will be.

Referring next to block 12, matching feature points between the captured images are identified to obtain a set of feature points. In this process, feature points are extracted from the images and those feature points are matched with corresponding feature points of the other images. By identifying the feature points, one can track how the feature points in the scene move from image to image (frame to frame). This provides an indication of the relative movement between the scene and the camera, which in turn enables determination of the geometry and position of objects and voids within the scene. In some embodiments, the matching can be performed using SIFT. Generally speaking, the feature points are associated with distinctive aspects of the objects within the scene (e.g., distinctive elements of buildings) that can be identified across multiple images. Generally speaking, the greater the number of matching feature points that are identified, the better the estimation.

In some embodiments, only a small number of feature points are needed to determine camera pose. Therefore, it may be desirable to select a subset of the feature points that will be used to estimate the pose of the camera, as indicated in block 14. As noted above, the number of feature points can be reduced by using a sampling-with-replacement strategy to generate a number of feature point hypotheses that have small correlation.

Once the desired number of feature points have been selected (e.g., 4 or 8), the rotation and translation (pose) of the camera during image capture can be estimated from the feature points, as indicated in block 16. In some embodiments, the rotation and the translation of the camera can be determined using PEGUS as described above. At this point, a known length within the captured scene or a known velocity of the camera can be identified, as indicated in block 18. As was described above, the length can either be manually input by a user or can be automatically determined using an image analysis algorithm. The velocity of the camera can be determined, for example, from speed and direction measurement devices provided on the object to which the camera is mounted.

Referring next to block 20, geometric reconstruction of the scene is performed using the estimated pose and either the known length or known velocity to obtain a reconstructed scene. Again, FIG. 4 shows an example reconstructed scene. In that example, the reconstructed scene comprises two lines L that represent the walls of buildings in the scene that faced the camera, and the triangles T that extend to the lines represent the white space between the buildings and the camera. As can be appreciated from that reconstructed scene, performing geometric reconstruction in essence converts the perspective of the video camera (i.e., a ground-level perspective) to an overhead perspective that can be compared to overhead images. Although the reconstructed scene shown in FIG. 4 is two-dimensional, it is noted that the geometric reconstruction can be three-dimensional, in which case other information, such as the height of objects in the scene, are determined. Such information can be obtained from LIDAR images that not only comprise a two-dimensional image of a geographical area but further comprise height information about objects in the image. In such a case, the height of the objects determined when geometric reconstruction is performed can be used as a further means to improve the estimation.

Figure 8:
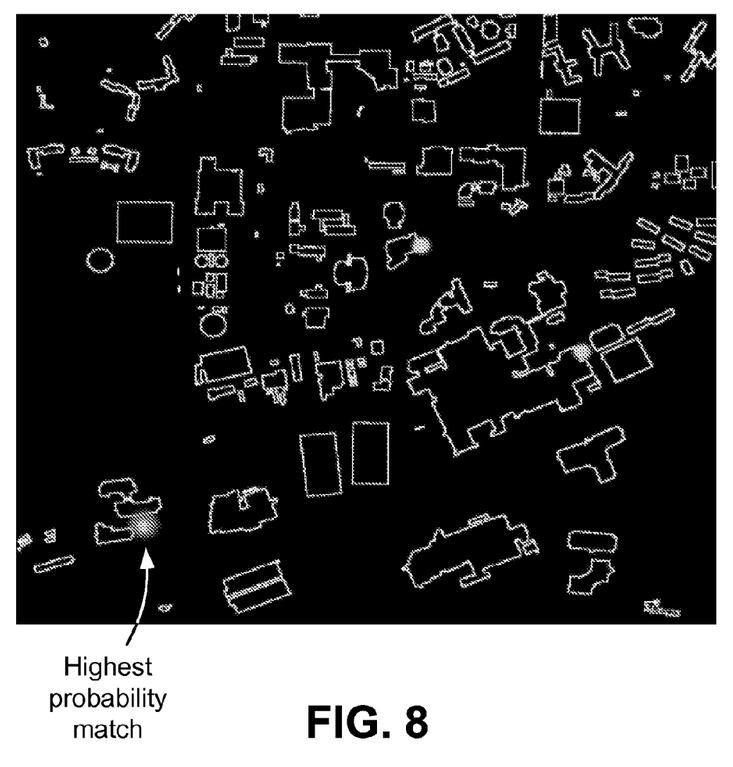
FIG. 8 shows an example result of estimating geographic location in which a highest probability match is highlighted within the occupancy grid map of FIG. 5, the match identifying the location at which the image in FIG. 1B and FIG. 4 was captured.

Once the reconstructed scene has been generated, it can be compared to overhead images to identify possible matches, as indicated in block 22 of FIG. 7. For example, the object geometries and the white spaces of the reconstructed scene can be compared to the geometries and white space of the OGM obtained from a satellite image. Possible matches can then be identified in the OGM. Such a situation is shown in FIG. 8 in which the highest probability match is identified in the lower left corner, which correlates with the location identified in the map of FIG. 1A at which the image of FIG. 1B was captured.

As was described above, the white space in both the reconstructed scene and the overhead images can be categorized to further improve the estimation. For example, that white space can be categorized as a field, a forest, a body of water, a parking lot, etc. to reduce the number of possible matches. The categorization can either be manual, in which case a user manually designates the white space as pertaining to a given category, or automatic in which case an algorithm automatically recognizes the type of white space based upon various cues, such as color or texture.

Figure 9:
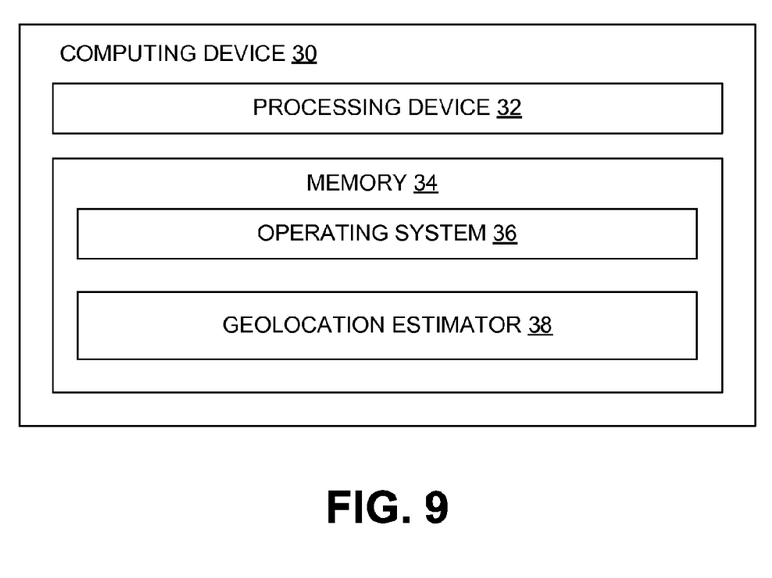
FIG. 9 is a block diagram of a computing device that can be used to estimate the geographic location at which image data was captured.

FIG. 9 illustrates an example architecture for a computing device 30 that can be used to perform at least part of the geolocation estimation described above in relation to FIG. 7. As indicated in FIG. 9, the computing device 30 at least comprises a processing device 32 and memory 34. The processing device 32 can include a central processing unit (CPU) or other processing device (e.g., microprocessor or digital signal processor) and the memory 34 includes any one of or a combination of volatile memory elements (e.g., RAM) and nonvolatile memory elements (e.g., flash, hard disk, ROM).

The memory 34 stores various programs (i.e., logic), including an operating system 36 and a geolocation estimator 38. The operating system 36 controls the execution of other programs and provides scheduling, input-output control, file and data management, memory management, and communication control and related services. The geolocation estimator 38 comprises one or more algorithms and/or programs that are configured to receive ground-level image data and analyze it to estimate the location at which the image data was captured. Accordingly, the geolocation estimator 38 can include one or more of a feature point matching algorithm/program, a pose estimation algorithm/program, a Euclidean reconstruction algorithm/program, and a matching and localization algorithm/program.

The invention claimed is:

1. A method for estimating a geographical location at which image data was captured with a camera, the method comprising:
identifying matching feature points between images captured by the camera over a period of time, the matching feature points comprising feature point pairs identified in at least two of the images;
estimating an estimated pose of the camera during capture of the images from the matching feature points, the estimated pose comprising rotation and translation of the camera during the capture of the images;
generating a reconstructed scene by performing geometric reconstruction of a scene in the images using the estimated pose of the camera and a known length of a feature in the scene, wherein the reconstructed scene identifies dimensional geometries of objects in the scene and white spaces between the camera and the objects, wherein the white spaces are horizontal areas substantially free of vertically-oriented objects; and
comparing the reconstructed scene to overhead images of known geographical origin to identify potential matches.

2. The method of claim 1, wherein the matching feature points are identified between ground-level images captured by the camera.

3. The method of claim 1, wherein the matching feature points between the images are identified using scale invariant feature transformation (SIFT).

4. The method of claim 1, wherein the estimated pose of the camera is estimated using pose estimation by gridding unit sphere (PEGUS).

5. The method of claim 1, wherein the geometric reconstruction comprises using the estimated pose of the camera, the known length of the feature in the scene and a known velocity of the camera.

6. The method of claim 1, wherein the geometric reconstruction converts a ground-level perspective of the images to an overhead perspective of the reconstructed scene.

7. The method of claim 1, wherein the overhead images comprise satellite images.

8. The method of claim 1, wherein the overhead images comprise occupancy-grid maps (OGMs) generated from satellite images, the OGMs comprising an array of cells of defined size, wherein an individual cell in the array of cells indicates whether that individual cell is occupied by a vertically-oriented object.

9. The method of claim 1, further comprising categorizing the white spaces between the camera and objects in the reconstructed scene and white spaces between the camera and objects in the overhead images to increase a speed with which potential matches are identified, wherein the white spaces are horizontal areas substantially free of vertically-oriented objects.

10. A system for estimating a geographical location at which image data was captured with a camera, the system comprising:
a processing device; and
memory storing a geolocation estimator that, when executed by the processing device, causes the system to:
identify matching feature points between images captured by the camera over a period of time, the matching feature points comprising feature point pairs identified in at least two of the images;
estimate an estimated pose of the camera during capture of the images from the matching feature points, the estimated pose comprising rotation and translation of the camera during the capture of the images;
generate a reconstructed scene by performing geometric reconstruction of a scene in the images using the estimated pose and a known velocity of the camera, wherein the reconstructed scene identifies dimensional geometries of objects in the scene and white spaces between the camera and the objects, wherein the white spaces are horizontal areas substantially free of vertically-oriented objects; and
compare the reconstructed scene to overhead images of known geographical origin to identify potential matches.

11. The system of claim 10, wherein the geolocation estimator causes the system to identify the matching feature points between the images using scale invariant feature transformation (SIFT).

12. The system of claim 10, wherein the geolocation estimator causes the system to estimate the rotation and the translation of the camera using pose estimation by gridding unit sphere (PEGUS).

13. The system of claim 10, wherein the geolocation estimator causes the system to perform the geometric reconstruction using the estimated pose of the camera, the know velocity of the camera and a known length of a feature in the scene.

14. The system of claim 10, wherein the geometric reconstruction converts a ground-level perspective of the images to an overhead perspective of the reconstructed scene.

15. The system of claim 10, wherein the geolocation estimator causes the system to compare the reconstructed scene to occupancy-grid maps (OGMs) generated from satellite images, the OGMs comprising an array of cells of defined size, wherein an individual cell in the array of cells indicates whether that individual cell is occupied by a vertically-oriented object.

16. The system of claim 10, wherein the geolocation estimator causes the system to categorize the white spaces between the camera and objects in the reconstructed scene and white spaces between the camera and objects in the overhead images to increase a speed with which potential matches are identified, wherein the white spaces are horizontal areas substantially free of vertically-oriented objects.

17. A non-transitory computer-readable medium that stores a geolocation estimator for estimating a geographical location at which image data was captured with a camera, the geolocation estimator comprising instructions that, when executed by a computing device, causes the computing device to:
  identify matching feature points between images captured by the camera over a period of time, the matching feature points comprising feature point pairs identified in at least two of the images;
  estimate an estimated pose of the camera during capture of the images from the matching feature points, the estimated pose comprising rotation and translation of the camera during the capture of the images;
  generate a reconstructed scene by performing geometric reconstruction of a scene in the images using the estimated pose of the camera; and
  compare the reconstructed scene to occupancy-grid maps (OGMs) generated from overhead images of known geographical origin to identify potential matches, the OGMs comprising an array of cells of defined size, wherein an individual cell in the array of cells indicates whether that individual cell is occupied by a vertically-oriented object.

18. The computer-readable medium of claim 17, wherein the instructions cause the computing device to identify the matching feature points between the images using scale invariant feature transformation (SIFT).

19. The computer-readable medium of claim 17, wherein the instructions cause the computing device to estimate the rotation and the translation of the camera using pose estimation by gridding unit sphere (PEGUS).

20. The computer-readable medium of claim 17, wherein the instructions cause the computing device to perform the geometric reconstruction using both the estimated pose of the camera and a known length of a feature in the scene.

21. The computer-readable medium of claim 17, wherein the instructions cause the computing device to perform the geometric reconstruction using both the estimated pose of the camera and a known velocity of the camera.

22. The computer-readable medium of claim 17, wherein the geometric reconstruction converts a ground-level perspective of the images to an overhead perspective of the reconstructed scene.

23. The computer-readable medium of claim 17, wherein the reconstructed scene identifies dimensional geometries of objects in the scene and white spaces between the camera and the objects, wherein the white spaces are horizontal areas substantially free of vertically-oriented objects.

24. The computer-readable medium of claim 17, wherein the OGMs are generated from satellite images.

25. The computer-readable medium of claim 17, wherein the instructions cause the computing device to categorize white spaces between the camera and objects in both the reconstructed scene and the overhead images to increase a speed with which potential matches are identified, wherein the white spaces are horizontal areas substantially free of vertically-oriented objects.

* * * * *

UNITED STATES PATENT AND TRADEMARK OFFICE
CERTIFICATE OF CORRECTION

PATENT NO. : 9,501,699 B2
APPLICATION NO. : 14/004972
DATED : November 22, 2016
INVENTOR(S) : Hakjae Kim et al.

It is certified that error appears in the above-identified patent and that said Letters Patent is hereby corrected as shown below:

In the Specification

Column 1, Lines 19-22:
Replace:
--This invention was made with Government support under contract number 00078739, awarded by the U.S. Department of Defense.--

With:
"This invention was made with Government support under contract number HM1582-09-1-0016, awarded by the U.S. Department of Defense."

Signed and Sealed this
Twenty-first Day of March, 2017

Michelle K. Lee
*Director of the United States Patent and Trademark Office*